United States Patent [19]

Moir

[11] 4,260,455
[45] Apr. 7, 1981

[54] MIRROR PLASMA APPARATUS

[75] Inventor: Ralph W. Moir, Livermore, Calif.

[73] Assignee: The United States of America as represented by the Unites States Department of Energy, Washington, D.C.

[21] Appl. No.: 886,370

[22] Filed: Mar. 14, 1978

[51] Int. Cl.³ .............................................. G21B 1/00
[52] U.S. Cl. ............................................. 176/9; 176/5
[58] Field of Search .................... 176/1, 3, 5, 6, 7, 8, 176/9

[56] References Cited

U.S. PATENT DOCUMENTS

| 3,005,767 | 10/1961 | Boyer et al. | 176/5 |
|---|---|---|---|
| 3,071,525 | 1/1963 | Christofilos | 176/4 |
| 3,117,912 | 11/1964 | Imhoff et al. | 176/5 |
| 3,663,362 | 5/1972 | Stix | 176/4 |
| 3,664,921 | 5/1972 | Christofilos | 176/4 |
| 3,668,067 | 6/1972 | Christofilos | 176/5 |
| 3,708,391 | 1/1973 | Christofilos | 176/4 |
| 3,728,217 | 4/1973 | Dandl | 176/5 |
| 3,762,992 | 10/1973 | Hedstrom | 176/1 |
| 4,116,264 | 9/1978 | Farfaletti-Casali et al. | 176/3 |

OTHER PUBLICATIONS

Physics of Fluids, vol. 17, No. 9 (9/74), pp. 1707-1718, Barcilow et al.
Physics of Fluids, vol. 17, No. 3 (3/74), pp. 662-663, Book al. Nuclear
Nuclear Fusion, vol. 17(1) (2/77), pp. 115-123 Sestro.
S45480224, 176-1, Laser Controlled Reactor Design Problems, Williams pp. 219-230.
Nuclear Fusion (11) (1971), Rotating Plasmas, Lehwert, pp. 485-533.
Ionized Gases, von Engel, pp. 236-238, 1965 Oxford.

Primary Examiner—S. A. Cangiglosi
Attorney, Agent, or Firm—L. E. Carnahan; Roger S. Gaither; James E. Denny

[57] ABSTRACT

A mirror plasma apparatus which utilizes shielding by arc discharge to form a blanket plasma and lithium walls to reduce neutron damage to the wall of the apparatus. An embodiment involves a rotating liquid lithium blanket for a tandem mirror plasma apparatus wherein the first wall of the central mirror cell is made of liquid lithium which is spun with angular velocity great enough to keep the liquid lithium against the first material wall, a blanket plasma preventing the lithium vapor from contaminating the plasma.

10 Claims, 5 Drawing Figures

MIRROR PLASMA APPARATUS

BACKGROUND OF THE INVENTION

The invention described herein was made at the Lawrence Livermore Laboratory in the course of, or under, Contact No. W-7405-ENG-48 between the U.S. Department of Energy and the University of California.

The invention relates to mirror plasma apparatus, and in particular to a mirror plasma apparatus utilizing lithium walls and a blanket plasma formed by arc discharge for shielding the mirror plasma from contamination by lithium vapor.

Mirror plasmas, produced in magnetic confinement mirror fusion apparatus as known in the art, need a source of ions to replace the losses out of the ends. The density and temperature of the mirror plasma is maintained by energetic netural beam injection. However, by injecting a neutral beam, some neutrals are added to the background gas load of the mirror machine. These neutral gas atoms will eventually collide with the mirror plasma. A charge exchange reaction results in a cold ion and leaves an energetic neutral. The difference in energy between the former mirror plasma ion and the resultant cold ion represents a loss of energy to the mirror plasma if the energetic neutral escapes the mirror plasma without being reionized. Without neutral beam injection the mirror plasma cannot be maintained. With neutral beam injection the resulting background neutrals lead to charge exchange cooling of the mirror plasma. Thus, a need exists in the prior art for means to shield the mirror plasma from background neutrals.

In addition to the plasma shielding problem, the problem of neutron damage to the inner or first wall of the apparatus exists. In attempts to solve this problem, many designs have been proposed to use lithium first walls in fusion apparatus. The 14 MeV neutrons, which carry 80% of the energy of a deuterium-tritium reaction, damage all materials they hit. The design of a fusion apparatus is limited by the frequency of replacement of the first wall and blanket material versus the expected neutron flux and power density. One solution to the problem of first wall and blanket damage is to use a material which is automatically replaced in the operation of the apparatus. A fluid flowing along the inner sides of the chamber containing the magnetic field with the mirror plasma becomes the first wall and blanket. The fluid may be filtered and processed during its pumping cycle. The best fluid is lithium because it breeds tritium by neutron capture and has good heat transfer properties. One of the major problems of using a liquid lithium first wall is the vapor pressure of the liquid lithium. A typical vacuum for a plasma confinement apparatus is $10^{-6}$ Torr, and the lithium vapor acts as a contaminant to the plasma in the apparatus; and when the lithium vapor reaches the mirror plasma charge exchange losses of mirror plasma energy occur as well. Thus, a need also exists to solve the lithium vapor pressure problem of the liquid lithium first wall.

SUMMARY OF THE INVENTION

The present invention provides a solution to the above mentioned problems of shielding the mirror plasma from background neutrals, preventing neutron damage of the apparatus first wall, and preventing contamination of the mirror plasma by lithium vapor. The mirror plasma shielding is provided by an arc discharge which generates a low-temperature, high density blanket plasma to surround the mirror plasma; the blanket plasma also functions to prevent contamination of the mirror plasma by lithium vapor from a lithium first wall. The illustrated embodiment involves a tandem mirror apparatus which utilizes a rotating liquid lithium blanket with an arc discharge generated blanket plasma which ionizes the lithium vapor which then moves along magnetic field lines into a gas dump along with the blanket plasma.

Therefore, it is an object of the invention to provide a method and means for shielding mirror plasma from background neutrals.

A further object of the invention is to provide a method and means for preventing contamination of a mirror plasma by providing a blanket plasma thereabout.

Another object is to provide a liquid lithium first wall in a fusion apparatus and means for preventing contamination of the plasma by lithium vapor.

Another object of the invention is to provide a method and means for producing a blanket plasma about the mirror plasma of a fusion reactor.

Another object of the invention is to provide a tandem mirror apparatus utilizing a rotating liquid lithium first wall and a blanket plasma for preventing contamination and charge exchange losses of the mirror plasma.

Other objects of the invention will become readily apparent to those skilled in the art from the following description and accompanying drawings.

DETAILED DESCRIPTION OF INVENTION

The invention basically involves shielding of mirror plasma, as in a tandem plasma confinement apparatus, by arc discharge forming a blanket plasma and utilizing liquid lithium as an inner or first wall with the blanket plasma serving to prevent contamination of the mirror plasma by lithium vapor, the lithium wall in one embodiment being of the rotating type. For purposes of clarity of description, inasmuch as three basic concepts are involved, and the interrelation therebetween, the following description will be separated into sections relating to: (1) shielding by arc discharge, (2) lithium walls with blanket plasma, and (3) rotating liquid lithium blanket.

SHIELDING BY ARC DISCHARGE

As pointed out above, mirror plasmas need a source of ions to replace the losses out the ends, with the density and temperature thereof being maintained by energetic neutral beam injection which adds some neutrals to the background gas load and which collide with the mirror plasma causing a charge exchange reaction which results in a loss of energy to the mirror plasma. The invention involves shielding of the mirror plasma from the background neutrals, and as described later, from lithium vapor. It has been found that an arc discharge can generate a low-temperature, high density blanket plasma to surround the mirror plasma. The losses in the energetic neutral beam in moving through the blanket plasma can be more than made up by the energy saved from loss to the mirror plasma by charge exchange with background neutrals. The background neutrals come out of the energetic neutral beam source as well and are stopped by the blanket plasma.

The blanket plasma, formed by the arc discharge, follows the magnetic field lines around the periphery of the mirror plasma, and must be continuous. The hollow-cathode discharge is a plasma source which has been used to feed high-density plasma columns of several meters in length in steady state. For more information on the hollow cathode see A. Von Engle, *Ionized Gases* 2d Ed. (Clarendon Press, Oxford; 1965) pages 236–238 and the references on page 316. Since the blanket plasma follows magnetic field lines and plasma sources are available to produce long columns of plasma, the electrodes are located in the end regions of the vacuum system near or beyond the mirroring regions. The plasma blanket is symmetric about the center of the mirror system. Thus the discharges may be operated in the double-ended Penning Ionization Gauge configuration, for example.

Figure 1:
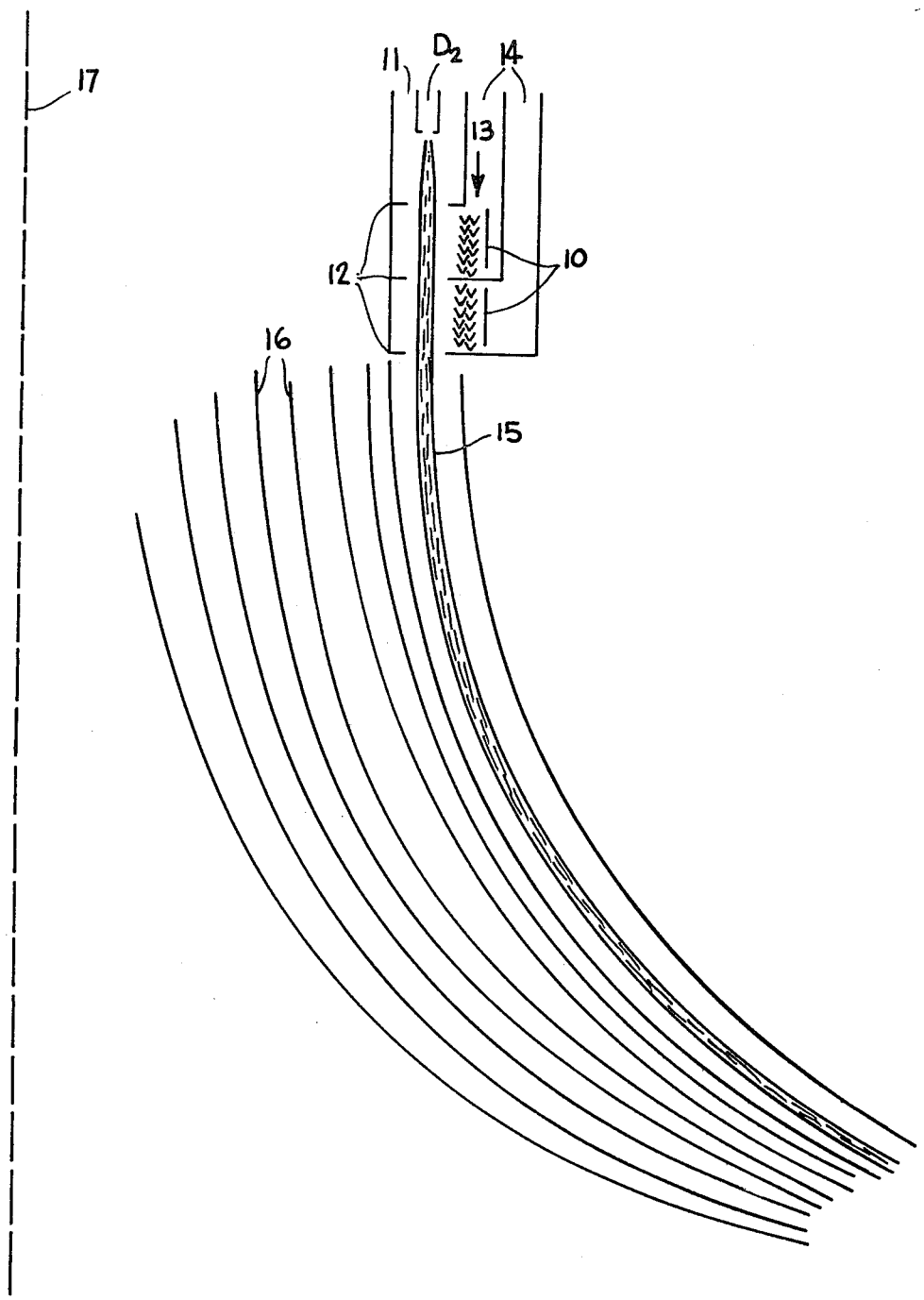
FIG. 1 illustrates a hollow - cathode discharge producing a blanket plasma down magnetic field lines.

FIG. 1 illustrates schematically a hollow-cathode discharge producing a blanket plasma down magnetic field lines, in accordance with the invention. In this embodiment a hollow cathode 11 arcs to anodes 12 creating a blanket plasma of low temperature relative to the mirror plasma. Deuterium gas ($D_2$), or another gas, from a source not shown is ionized by this discharge. The configuration of the anodes 12 serve to limit the size of the emerging blanket plasma as well. Chevrons 13 cooled such as by liquid nitrogen and water, form heat shields between the cryo-pumping region 10 and the arc plasma. Beyond the chevrons 13 are ducts 14 connected to vacuum pumps, not shown, used to pump the gas during defrosting of the cryosurfaces. The hollow-cathodes 11 are placed evenly spaced about the mirror plasma near the mirroring region or possibly beyond. The stream 15 indicates the blanket plasma moving out along magnetic field lines 16, the curvature of the magnetic field lines 16 being exaggerated. The axis of a mirror cell is indicated by dotted line 17, and the mirror plasma, not shown, is formed about axis 17.

In operation a gas, such as $D_2$, from a source, is fed through the hollow cathode 11. A potential is placed across the cathode to anode such that an arc develops which ionizes the gas. The ionized gas is collimated into a beam due to the magnetic field. The holes in the center of anodes 12 limit the size of the ionized deuterium beam. As the ionized gas emerges from the hollow cathode 11, it is moving along a set of specific magnetic field lines. This ionized beam, which is now the blanket plasma 15, continues in a column for the length of the mirror cell to a gas dump on the other end of the mirror cell. Hollow cathodes and gas dumps can be alternated at both ends of the mirror cell or with all hollow cathodes on one end and all gas dumps on the opposite end of the mirror cell. Either way a continuous blanket plasma can be formed to shield the mirror plasma formed about axis 17 from background neutrals to maintain the mirror plasma since the energetic neutral beams must hit the mirror plasma for neutral beam ionization. Thus, the energetic neutral beam must pass through the blanket plasma. Some of the energetic neutrals are lost in the blanket plasma. However, more energy would be lost to the mirror plasma from charge exchange cooling with background neutrals without the presence of the blanket plasma than is lost to the mirror plasma by some of the energetic neutrals being stopped at the blanket plasma.

LITHIUM WALLS WITH BLANKET PLASMA

As pointed out above, many designs of plasma confinement apparatus propose the use of liquid lithium inner or first walls, but the problem of contamination of the mirror plasma by lithium vapor has not been previously solved. The present invention involves the use of a liquid lithium first wall with a blanket plasma between the liquid lithium and the mirror plasma. The blanket plasma, formed by arc discharge as described above, takes up the lithium vapor by ionizing it. Once ionized the lithium ions flow along magnetic field lines to a gas dump just as the blanket plasma does, and thus the lithium vapor does not get to and contaminate the mirror plasma.

Figure 2:
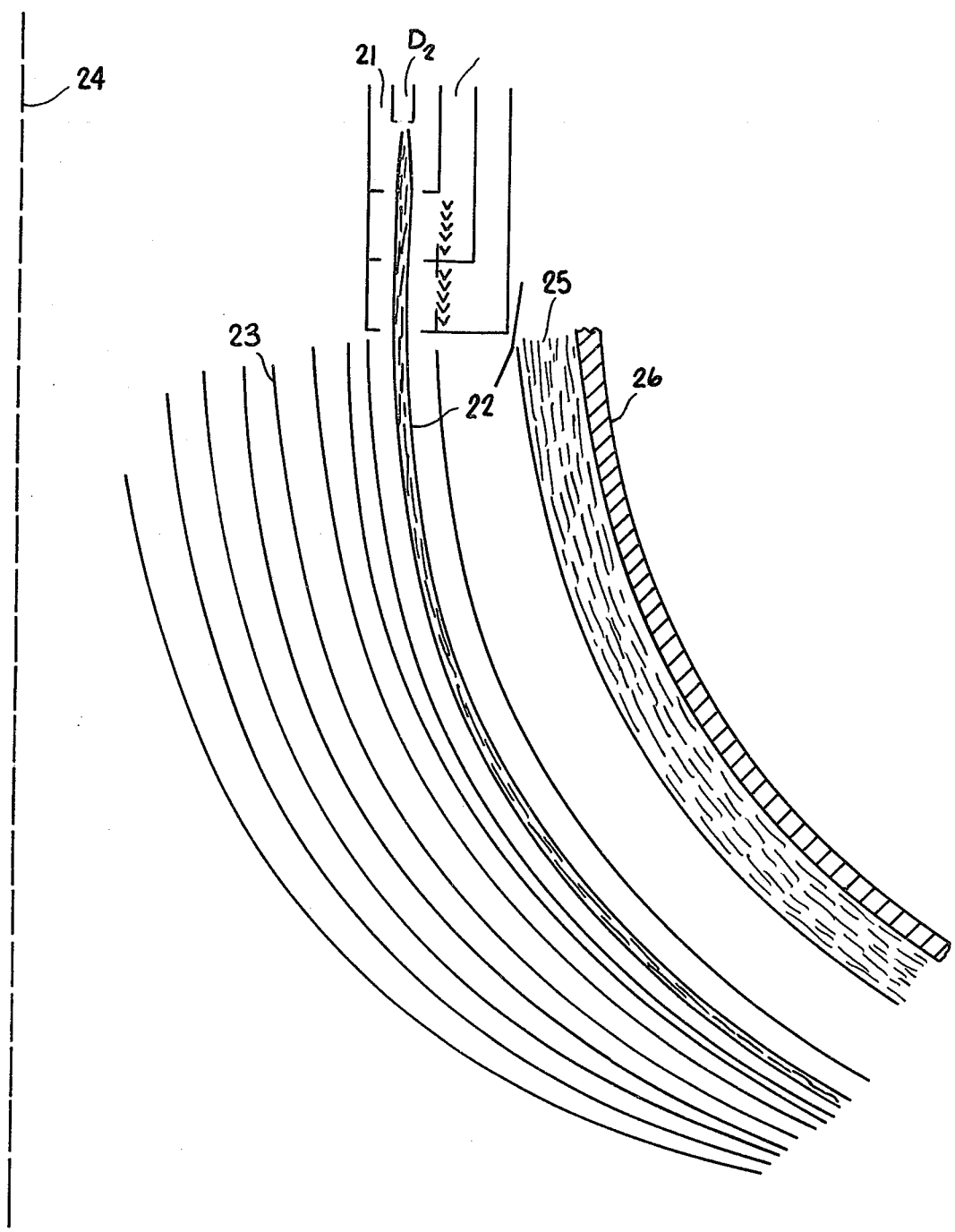
FIG. 2 illustrates a liquid lithium first wall of an apparatus with a blanket plasma between the liquid wall and the mirror plasma.

Referring to FIG. 2, a blanket plasma source, generally indicated at 21 and constructed similar to the FIG. 1 embodiment, produces a blanket plasma 22 which streams along magnetic field lines 23 from the blanket plasma source near the mirroring region at one end to a gas dump located on the same magnetic field lines near the mirroring region at the other end. Enough of the blanket plasma sources are located about the periphery of the magnetic field lines 23 that a continuous blanket plasma 22 is formed about the mirror plasma. Axis 24 is the axis of the mirror cell from one mirroring region to the other. The liquid lithium 25 flows from a source, not shown, along a solid or structural wall 26 in a continuous stream thick enough to substantially lessen the neutron damage to the solid wall 26. The liquid lithium must have associated injectors and drains along the solid wall 26. Outside of the solid wall are located the liquid lithium pumps, sumps, and processing equipment. Such equipment is well known in the liquid metal breeder reactor field.

In operation, the liquid lithium 25 flows along the solid wall 26. The depth of the liquid lithium is sufficient to reduce neutron damage to the solid wall to an acceptable rate for the apparatus design. The blanket plasma source 21 produces the blanket plasma 22 which streams down magnetic field lines 23 between the liquid lithium 25 and the mirror plasma formed, but not shown, about axis 24. As the lithium vapor leaves the liquid lithium it diffuses toward the blanket plasma. When the lithium vapor reaches the blanket plasma 22, it is ionized. Upon ionization, the lithium ions flow along the magnetic lines 23 with the blanket plasma 22 into the gas dumps. Thus, the lithium vapor does not reach the mirror plasma and contamination thereof is prevented.

ROTATING LIQUID LITHIUM BLANKET

As described above, there are many designs in the prior art using liquid lithium as a first wall material to attenuate the neutron flux at the first material surface which the neutrons strike in a controlled fusion application. The liquid lithium may be constantly replaced in the apparatus, with contaminants, tritium, and heat being removed therefrom, prior to recirculation. This may be all part of normal apparatus operation instead of shutting down the apparatus to replace a solid first wall. One of the major problems in using a liquid lithium first wall, as pointed out above, is the vapor pressure of the liquid lithium, with the lithium vapor acting as a contaminant to the plasma in the apparatus.

The present invention utilizes a liquid lithium first wall with a blanket plasma to solve the lithium vapor pressure problem, with the blanket plasma also serving to protect the mirror plasma from incident neutrals and the resultant loss of energy to the mirror plasma. The blanket plasma, produced by an arc discharge, is a relatively cool plasma streaming along magnetic field lines about the periphery of a magnetic mirror cell. The blanket plasma is not in contact with the main body of the mirror cell plasma and is between the mirror cell plasma and the liquid lithium first wall, thus forming a shield about the mirror plasma. The blanket plasma ionizes the lithium vapor, as described above, and the ionized lithium then moves along magnetic field lines into a gas dump along with the blanket plasma.

Figure 3:
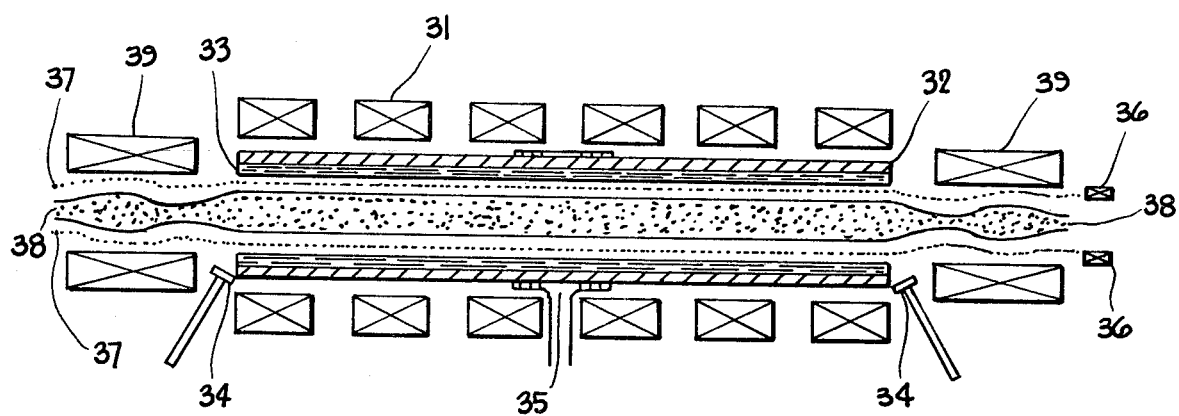
FIG. 3 illustrates a mirror cell of a tandem mirror plasma confinement apparatus utilizing a rotating liquid lithium first wall and a blanket plasma for preventing contamination of the mirror plasma and charge exchange losses of mirror plasma energy.

FIG. 3 illustrates the invention incorporated into a tandem mirror plasma confinement apparatus. As shown, a central mirror cell of a three mirror cell apparatus comprises solenoidal coils 31, a solid material containment first wall 32 which rotates about an axis running through the mirror cell coils 31, a layer or wall 33 of liquid lithium which covers the first material wall 32, inlet valves 34 for the liquid lithium, and outlet valves 35 for letting the liquid lithium out. A blanket plasma source, generally indicated at 36, produces a blanket plasma 37 which encircles and protects a mirror cell plasma 38. Source 36 may, for example, be constructed as illustrated in FIG. 1. Solenoidal coils 39 function to set up the stronger magnetic fields in the end mirror cells than in the center mirror cell. The stronger magnetic field correspondingly confines denser plasma in the end mirror cells than in the center mirror cell. These aspects of the tandem mirror do not constitute part of the present invention. While not shown in detail, wall 32 is rotated by drive mechanism 32', known in the art. Also, inlet valves 34 and outlets 35 may be interchanged such that the lithium flow is from the center of the cell outward. It is understood that appropriate pumping, sump, and processing apparatus for the liquid lithium would be located externally of the rotating solid wall 32.

In operation, the solid material first wall 32 which may be constructed of stainless steel, for example, rotates rapidly enough to keep the liquid lithium layer 33 against the solid first wall. For example, the rotational velocity of wall 32 may be approximately 200 RPM. The liquid lithium flows into the center mirror cell through the inlet valves 34 at the ends of the solenoid coils 31 and out through the outlet valves 35 in the center of the coils 31. For example, the thickness of the lithium layer 33 may be in the range of 50 to 100 cm with a flow rate in the range of 0.1 to 10 m per second. The blanket plasma 37 ionizes the lithium vapor before it gets to the mirror cell plasma 38, and the blanket plasma and lithium ions move along magnetic field lines into a gas dump, as above-described. For example, the blanket plasma 37 has the following parameters; 2 cm thick, $5 \times 10^{13}$ cm$^{-3}$ density, and 10–20 electron volts temperature of electrons, with the plasma source 36 having the following parameters: cathode diameter about 1 cm, gas feed to each cathode of order 0.1 to 1 atm-cm$^3$ sec$^{-1}$, and a current of 10 to 100 A. The liquid layer 33 attenuates the neutron flux hitting the solid material first wall 32. The thickness of the liquid lithium may be varied to determine the level of attenuation. By relaxing the solid first wall loading limitations by use of the lithium layer, a greater power density plasma with a longer replacement time period for the solid first wall is provided, thereby substantially reducing operational costs and down time of the apparatus.

Figure 4:
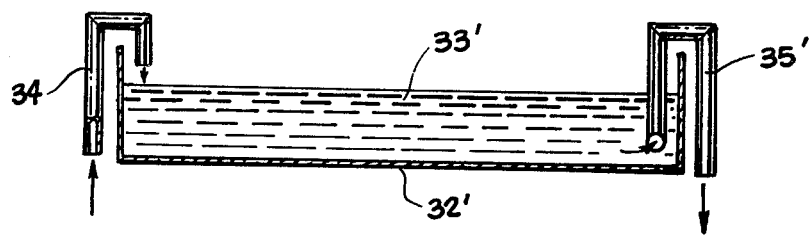
FIG. 4 is a partial enlarged schematic view of apparatus for handling the liquid lithium flow in the FIG. 3 embodiment.
Figure 5:
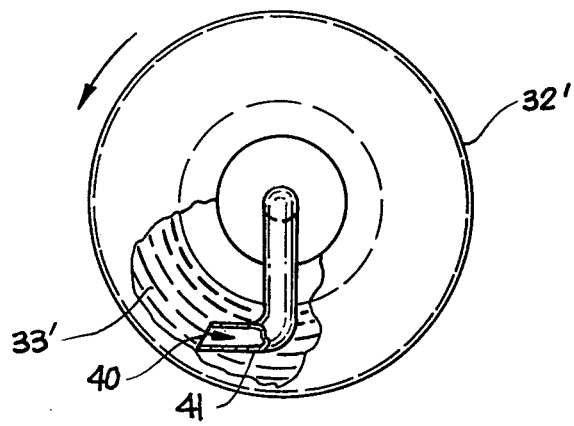
FIG. 5 is an end view of the FIG. 4 apparatus.

FIGS. 4 and 5 illustrate a way of handling the liquid lithium flow which avoids seals in the FIG. 3 embodiment. Valved inlet 34' and valved outlet 35' extend into wall 32' so as to supply and return lithium forming the liquid lithium wall 33'. Valved outlet 35' is provided with a scoop shaped end 40 on outlet pipe 41, such that the lithium will be forced out outlet pipe 41 because of the pressure due to rotation of the wall 32 as indicated by the arrow in FIG. 5 and helped by the scoop 40.

It has thus been shown that the present invention provides a means for protecting a plasma, such as utilized in a magnetic mirror confinement apparatus, from contamination by lithium vapor and from loss of energy due to background neutrals caused by neutral beam injection used to maintain the density and temperature of the mirror plasma.

While particular embodiments of the invention have been illustrated and/or described, modifications will become apparent to those skilled in the art, and it is intended to cover in the appended claims all such modifications as come within the spirit and scope of the invention.

What I claim is:

1. In a magnetic mirror confinement apparatus having a first solid material containment wall and means for generating and maintaining a longitudinally confined mirror plasma which extends longitudinally therein, the improvement comprising: means for protecting said first wall from neutron damage thereto utilizing a layer of liquid lithium; and means for shielding the confined mirror plasma from background neutrals together with the resultant loss of energy of the mirror plasma, and for protecting the mirror plasma from contamination by vapor from said lithium layer, said last-mentioned means consisting of a substantially longitudinally unconfined high density blanket plasma generated by substantially all of an arc discharge output, said blanket plasma having a temperature not greater than 20 electron volts and which extends about the periphery of the mirror plasma and between the mirror plasma and said containment wall, said blanket plasma ionizes and takes up said lithium vapor whereupon the lithium ions flow with substantially all of the blanket plasma to a gas dump; said second mentioned means including means for maintaining a layer of liquid lithium against an inner surface of said wall, means for directing liquid lithium into and out of said wall, and means for rotating said wall with a velocity sufficient to keep said layer of liquid lithium against said inner surface of said wall.

2. In the apparatus defined in claim 1, wherein said shielding means includes a hollow cathode and at least one anode for producing said arc discharge.

3. In the apparatus defined in claim 2, additionally including means for directing deuterium gas through said hollow cathode for ionization thereof by said arc discharge produced by said cathode and anode to form said blanket plasma.

4. In the apparatus defined in claim 2, additionally including a plurality of cooled chevrons positioned adjacent said anode forming heat shields between a blanket plasma region and a pumping region located thereabout.

5. The apparatus defined in claim 1, wherein said rotating wall is located within a plurality of solenoidal coils of a mirror confinement cell.

6. The apparatus defined in claim 5, wherein said liquid lithium is directed by said liquid lithium directing means inwardly along said rotating wall from opposite ends of said plurality of coils and directed outwardly at the center of said plurality of coils.

7. A method for shielding a longitudinally confined mirror plasma from background neutrals which collide with the mirror plasma causing a charge reaction which results in a loss of energy to the mirror plasma and for preventing neutron damage to a first solid material containment wall containing the mirror plasma, comprising the steps of: generating by arc discharge a substantially longitudinally unconfined high density blanket plasma having a temperature not greater than 20 electron volts and which extends longitudinally about the periphery of the mirror plasma and between the wall and the mirror plasma; providing a liquid lithium layer on an inner surface of the wall; rotating the wall at a sufficient velocity to keep the layer of liquid lithium against the wall; and additionally utilizing the blanket plasma to prevent contamination of the mirror plasma by lithium vapor by ionization and taking up of the lithium vapor by the high density blanket plasma such that the lithium ions flow with substantially all of the blanket plasma to a gas dump.

8. The method defined in claim 7, wherein the step of generating the blanket plasma is carried out by directing a selected gas through a hollow cathode, and causing the arc discharge between the cathode and at least one anode which ionizes the gas forming the blanket plasma.

9. The method defined in claim 7, additionally including the step of forming at least one heat shield intermediate the thus generated blanket plasma and a pumping region surrounding the blanket plasma.

10. The method defined in claim 7, additionally including the step of directing the liquid lithium inwardly along the wall from opposite ends of the wall thus forming the layer and directing same outwardly at the center of the wall.

* * * * *